(12) United States Patent
Olson et al.

(10) Patent No.: US 10,377,665 B2
(45) Date of Patent: Aug. 13, 2019

(54) MODIFYING BULK PROPERTIES OF A GLASS SUBSTRATE

(71) Applicant: Varian Semiconductor Equipment Associates, Inc., Gloucester, MA (US)

(72) Inventors: Joseph C. Olson, Beverly, MA (US); Ludovic Godet, Sunnyvale, CA (US); Gary Dickerson, Gloucester, MA (US)

(73) Assignee: VARIAN SEMICONDUCTOR EQUIPMENT ASSOCIATES, INC., Gloucester, MA (US)

( * ) Notice: Subject to any disclaimer, the term of this patent is extended or adjusted under 35 U.S.C. 154(b) by 596 days.

(21) Appl. No.: 14/995,306

(22) Filed: Jan. 14, 2016

(65) Prior Publication Data
US 2017/0144929 A1    May 25, 2017

Related U.S. Application Data

(60) Provisional application No. 62/257,478, filed on Nov. 19, 2015.

(51) Int. Cl.
*C03C 23/00* (2006.01)

(52) U.S. Cl.
CPC .......... *C03C 23/006* (2013.01); *C03C 23/004* (2013.01); *C03C 23/0055* (2013.01)

(58) Field of Classification Search
None
See application file for complete search history.

(56) References Cited

U.S. PATENT DOCUMENTS

| 6,750,462 | B2 | 6/2004 | Iwasawa et al. | |
|---|---|---|---|---|
| 6,828,204 | B2 | 12/2004 | Renau | |
| 7,544,957 | B2 | 6/2009 | Walther et al. | |
| 7,825,015 | B2 | 11/2010 | Sohn et al. | |
| 7,982,195 | B2 | 7/2011 | Agarwal et al. | |
| 8,552,404 | B2 | 10/2013 | Asai et al. | |
| 2002/0071994 | A1* | 6/2002 | Shimazu | B82Y 10/00 430/5 |
| 2012/0009511 | A1* | 1/2012 | Dmitriev | G03F 1/72 430/5 |

(Continued)

OTHER PUBLICATIONS

Ellie Y. Yieh, et al., Localized Stress Modulation for Overlay and EPE, U.S. Appl. No. 14/735,020, filed Jun. 10, 2015.

*Primary Examiner* — Shamim Ahmed
*Assistant Examiner* — Bradford M Gates (57) ABSTRACT

Embodiments of the disclosure provide an apparatus and methods for localized stress modulation for overlay and substrate distortion using electron or ion implantation directly to a glass substrate. In one embodiment, a process for modifying a bulk property of a glass substrate generally includes identifying a stress pattern of a glass substrate, determining doping parameters to correct a defect (e.g., overlay error or substrate distortion) based on the stress pattern, and providing a treatment recipe to a treatment tool, wherein the treatment recipe is formulated according to the doping parameters. The process may further include performing a doping treatment process on the glass substrate using the treatment recipe to correct the overlay error or substrate distortion. In some embodiments, the treatment recipe is determined by comparing the stress pattern with a database library containing data correlating stress changes in glass substrates to various doping parameters.

14 Claims, 7 Drawing Sheets

(56) References Cited

U.S. PATENT DOCUMENTS

2012/0056110 A1\* 3/2012 Distaso ............... H01J 37/3026
250/492.21
2014/0021373 A1\* 1/2014 Lubicki ................ H01J 37/026
250/492.3

\* cited by examiner

MODIFYING BULK PROPERTIES OF A GLASS SUBSTRATE

CROSS-REFERENCE TO RELATED APPLICATION

This application claims priority to U.S. Provisional Patent Application No. 62/257,478, filed Nov. 19, 2015, entitled "Modifying Bulk Properties of a Glass Substrate," and incorporated by reference herein in its entirety.

FIELD OF THE DISCLOSURE

Embodiments of the disclosure provided herein generally relate to an apparatus and methods for localized stress modulation in a glass substrate, for example, to correct overlay error or substrate distortion.

BACKGROUND OF THE DISCLOSURE

In the manufacture of integrated circuits (IC), or chips, patterns representing different layers of the chip are created by a chip designer. A series of reusable masks, or photomasks, are created from these patterns in order to transfer the respective designs of various chip layers onto a semiconductor substrate during the manufacturing process. Mask pattern generation systems use precision lasers or electron beams to image the design of the layers of the chip onto a respective mask. The masks are then used much like photographic negatives to transfer the circuit patterns for the layers onto a semiconductor substrate. These layers are built up using a sequence of processes and translate into the tiny transistors and electrical circuits comprising the completed chip. Conventionally, devices on semiconductor substrates are manufactured by a sequence of lithographic processing operations for forming the devices from a plurality of overlying layers having individual patterns. Generally, a set of 15 to 100 masks is used to construct a chip, and can be used repeatedly.

Flat panel glass is used as a substrate in the production of displays. Alignment of many patterned features in many layers and process operations is influential to the ultimate pixel size and intended display resolution. Residual stress in the glass inherent to the glass manufacturing process may cause patterns on the glass to move during subsequent processing operations. For example, a thermal operation may relieve either locally or globally the stress in the glass substrate resulting in a pattern misalignment with features formed later in the process flow, thus decreasing the yield of higher resolution displays.

SUMMARY OF THE DISCLOSURE

In view of the foregoing, embodiments herein provide an apparatus and methods for localized stress modulation for overlay and substrate distortion using electron or ion implantation directly to a glass substrate. A treatment may be performed to modify the stress in the glass prior to the start of a display manufacturing process in order to improve the alignment of patterned features and improve the yield of higher resolution displays.

In one embodiment, a method is provided for modifying a bulk property of a glass substrate. The method includes identifying a stress pattern of a glass substrate, determining doping parameters to correct a defect (e.g., overlay error or substrate distortion) based on the stress pattern, and providing a treatment recipe to a treatment tool, wherein the treatment recipe is formulated according to the doping parameters, and wherein the treatment recipe defines a doping treatment process applied directly to the glass substrate to correct the defect.

In one embodiment, a method is provided for determining and correcting errors on a glass substrate. The method includes identifying a stress pattern of a glass substrate using a metrology tool, determining doping parameters to correct overlay error or substrate distortion based on the stress pattern, and providing a treatment recipe to a treatment tool based on the doping parameters determined to correct substrate distortion or overlay error. The method further includes modifying a bulk property of the glass substrate by performing a doping treatment process directly into a surface of the glass substrate using the treatment recipe.

In one embodiment, an apparatus is provided for modifying a bulk property of a glass substrate. The apparatus includes a metrology tool identifying a stress pattern of a glass substrate, a computer system in communication with the metrology tool, wherein the computer system determines doping parameters to correct overlay error or substrate distortion based on the stress pattern. The apparatus further includes a treatment tool receiving a treatment recipe formulated based on the doping parameters, wherein the treatment tool performs a doping treatment process directly on the glass substrate using the treatment recipe.

The drawings are not necessarily to scale. The drawings are merely representations, not intended to portray specific parameters of the disclosure. Furthermore, the drawings are intended to depict exemplary embodiments of the disclosure, and therefore is not considered as limiting in scope.

DETAILED DESCRIPTION

An apparatus and methods in accordance with the present disclosure will now be described more fully hereinafter with reference to the accompanying drawings, where embodiments of the methods are shown. The apparatus and methods may be embodied in many different forms and are not to be construed as being limited to the embodiments set forth herein. Instead, these embodiments are provided so this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts with respect to the geometry and orientation of a component of a device as appearing in the figures. The terminology will include the words specifically mentioned, derivatives thereof, and words of similar meaning and/or significance.

As used herein, an element or operation recited in the singular and proceeded with the word "a" or "an" is to be understood as including plural elements or operations, until such exclusion is explicitly recited. Furthermore, references to "one embodiment" of the present disclosure are not intended as limiting. Additional embodiments may also incorporating the recited features.

Figure 1:
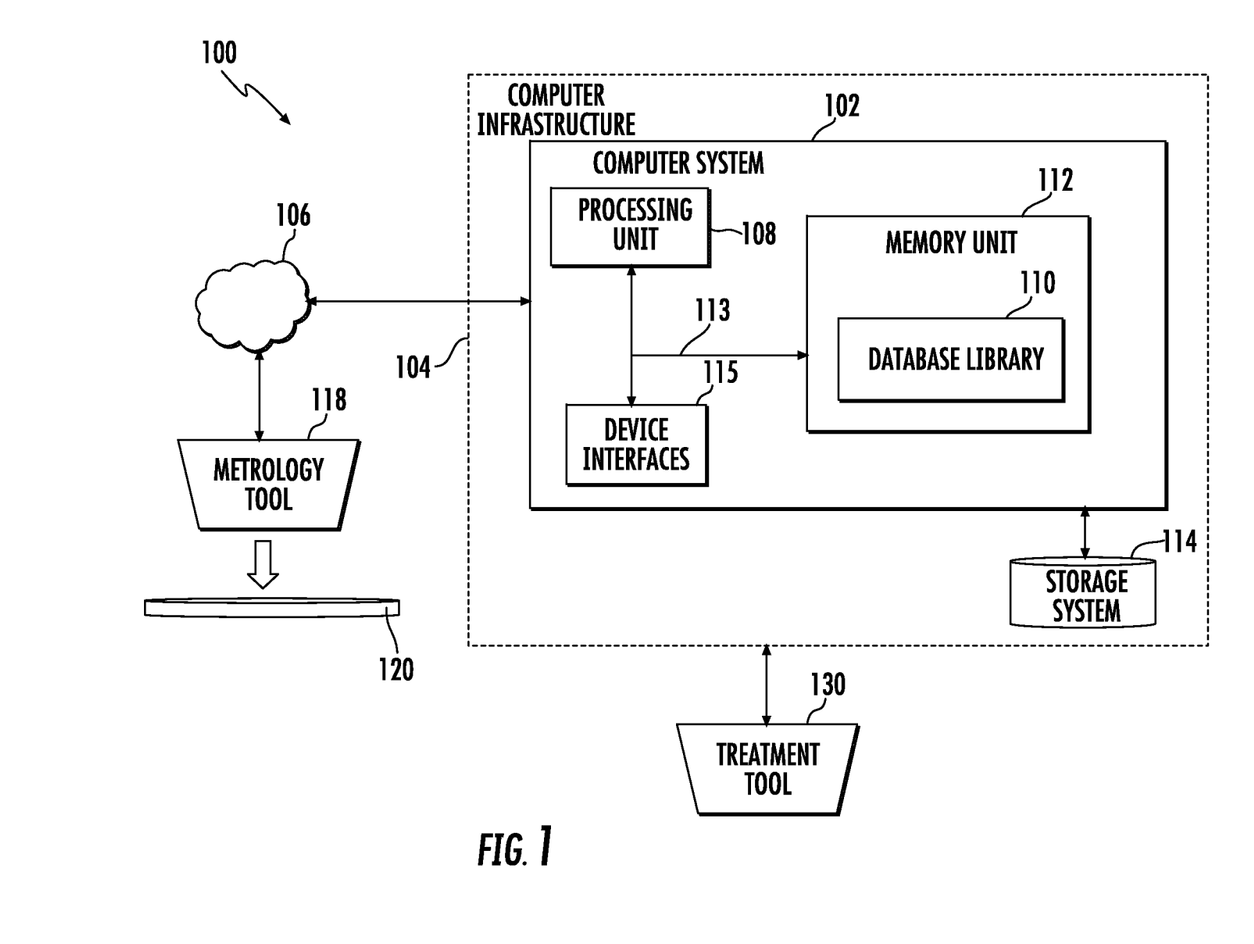
FIG. 1 shows a schematic of an exemplary system in accordance with certain aspects of the present disclosure.

With reference now to the figures, FIG. 1 depicts a system 100 for modifying a bulk property of a glass substrate. As shown, the system 100 includes a computer system 102 deployed within a computer infrastructure 104. This is intended to demonstrate, among other things, embodiments herein can be implemented within a network environment 106 (e.g., the Internet, a wide area network (WAN), a local area network (LAN), a virtual private network (VPN), etc.), a cloud-computing environment, or on a stand-alone computer system. Still yet, the computer infrastructure 104 is intended to demonstrate some or all of the components of the system 100 could be deployed, managed, serviced, etc., by a service provider offering to implement, deploy, and/or perform the functions of the present embodiments for others.

The computer system 102 is intended to represent any type of computer system implemented in deploying/realizing the teachings recited herein. In this particular example, the computer system 102 represents an illustrative system for modifying a bulk property of a glass substrate. The computer system 102 depicted is non-limiting, as any other computers implemented under various embodiments may have different components/software and will perform similar functions. As further shown, the computer system 102 includes a processing unit 108, a memory unit 112, a bus 113, and device interfaces 115.

Processing unit 108 refers, generally, to any apparatus for performing logic operations, computational tasks, control functions, etc. A processor may include one or more subsystems, components, and/or other processors. A processor may include various logic components operable using a clock signal to latch data, advance logic states, synchronize computations and logic operations, and/or provide other timing functions. During operation, the processing unit 108 receives signals transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, the processing unit 108 executes computer program code stored in memory unit 112 and/or storage system 114. While executing computer program code, processing unit 108 can read and/or write data to/from the memory unit 112 and/or the storage system 114. The storage system 114 may comprise VCRs, DVRs, RAID arrays, USB hard drives, optical disk recorders, flash storage devices, and/or any other data processing and storage elements for storing and/or processing data. Although not shown, computer system 102 could also include I/O interfaces communicating with one or more hardware components of computer infrastructure 104 to enable a user to interact with computer system 102 (e.g., a keyboard, a display, camera, etc.). As will be described in further detail below, the computer infrastructure 104 is configured to operate with a metrology tool 118 for scanning and determining stress pattern(s) in a glass substrate 120, for example, by comparing the stress pattern(s) with a database library 110 stored in the memory unit 112, and communicating a treatment solution to a treatment tool 130.

Although not shown in detail for the sake of brevity, in some embodiments, the metrology tool 118 may include an illumination system (illuminator) configured to condition a radiation beam (e.g. UV radiation or DUV radiation), a support structure (e.g. a mask table) constructed to hold a patterning device (e.g. a mask), and a substrate table (e.g. a wafer table) constructed to hold the glass substrate 120. The metrology tool may further include a projection system (e.g. a refractive projection lens system) configured to project a pattern imparted to the radiation beam by patterning device onto a target portion (e.g. comprising one or more dies) of the glass substrate 120.

During operation, the illuminator of metrology tool 118 receives a radiation beam from a radiation source. The illuminator may comprise an adjuster configured to adjust the angular intensity distribution of the radiation beam. Generally, at least the outer and/or inner radial extent (commonly referred to as σ-outer and σ-inner, respectively) of the intensity distribution in a pupil plane of the illuminator can be adjusted. The illuminator may be used to condition the radiation beam, and to have an intended cross-section uniformity and intensity distribution. The radiation beam is incident on the patterning device (e.g., mask) held on the support structure, and is patterned by the patterning device. Having traversed the patterning device, the radiation beam passes through the projection system, focusing the beam onto a target portion of the substrate.

According to certain aspects, the computing system 102 may be incorporated in the metrology tool 118 or in the treatment tool 130. Alternatively, as shown, the computing system 102 may be in data communication with the metrology tool 118 and the treatment tool 130.

Figure 2:
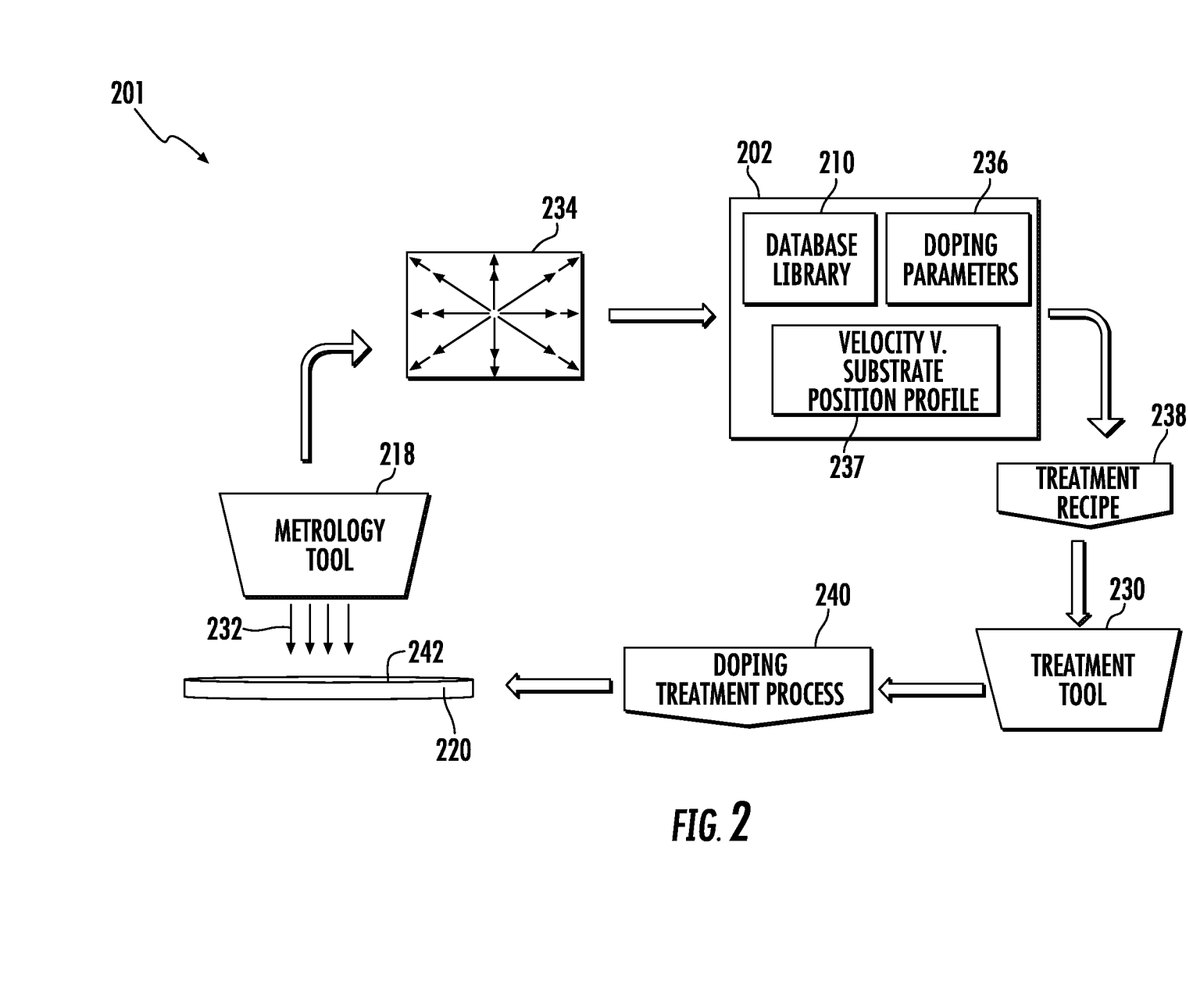
FIG. 2 shows a schematic of an exemplary apparatus in accordance with certain aspects of the present disclosure.

Referring now to FIG. 2, operation of an apparatus for modifying a bulk property of a glass substrate will be described in greater detail. As shown, an apparatus 201 includes the metrology tool 218 in communication with the computer system 202 for scanning 232 the glass substrate 220 and identifying a stress pattern 234 therein. In some embodiments, the stress pattern 234 demonstrates or evidences a defect, distortion, abnormality, etc., in the glass substrate 220. The stress pattern 234 may be delivered to the computer system 202 for determining doping parameters 236 to correct an overlay error and/or substrate distortion based on the stress pattern 234.

In one embodiment, the apparatus 201 further includes the database library 210 arranged within the computer system 202. The database library 210 contains data correlating stress changes in various glass substrates to a variety of doping parameters. In exemplary embodiments, a database library 210 may be established by obtaining the relationship/correlation of the substrate stress (or in-plane strain, pattern shift, or substrate curvature), for example, in the form of the stress pattern 234, to the implant dose, strength, or chemical composition for repairing the glass substrate 220. As such, the residual stress at discrete localized areas of the glass substrate 220 may be corrected or released based on the computation/calculation from the database library 210, so as to reduce/correct overlay errors present on the glass substrate 220 and enhance alignment precision of a subsequent manufacturing process.

The computer system 202 may then generate a treatment recipe 238 based on the doping parameters, and provide the treatment recipe 238 to the treatment tool 230 to correct the substrate distortion, overlay error, etc. In one embodiment, the treatment recipe 238 may include a variable ion dose as a function of position on the glass substrate 220 corresponding to the stress pattern 234. In exemplary embodiments, the treatment tool 230 performs a doping treatment process 240, such as ion bombardment, directly to a surface 242 (e.g., a top, exposed surface having no film layer formed thereon) of the glass substrate 220 using the treatment recipe 238 to locally modify a bulk property of a glass substrate 220. More specifically, the doping treatment process 240 is a repair process for altering or modifying properties of the glass substrate 220 exposed to the ion implantation. An example property to be altered may be the stress/in-plane strain (or pattern shift, or substrate curvature) in the glass substrate 220. The alteration may result in a change to the shape of the die grid, thus improving alignment precision for subsequent processing operations.

In some embodiments, the computer system 202 communicates with the metrology tool 218 and the treatment tool 230, and computes a velocity versus substrate position profile 237 for the glass substrate 220 based on a two-dimensional distribution of ions (not shown) generated by the treatment tool 230 and the treatment recipe 238. Specifically, for a given velocity profile, the total dose at any given point on the substrate can be computed by integrating the beam current at the given point, known from the two-dimensional profile, multiplied by the time the substrate spends at the given point, known from the velocity. The effect of the dose distribution on the substrate property to be modified can be determined from a database and compared to the intended effect. A search algorithm may be used to evaluate more than one candidate velocity profile and select the one predicted to most closely produce the intended result on the glass substrate.

The computer system 202 may then provide the velocity versus substrate position profile 237 to the treatment tool 130, and the doping treatment process 240 is performed on the glass substrate 220 according to the velocity versus substrate position profile 237.

In various embodiments, as will be described in greater detail below, the treatment tool 230 includes a transport system for positioning and moving the glass substrate 220, and an ion source for generating one or more the following: a plasma beam, an electron beam, a ribbon beam, or a particle beam.

Figure 3:
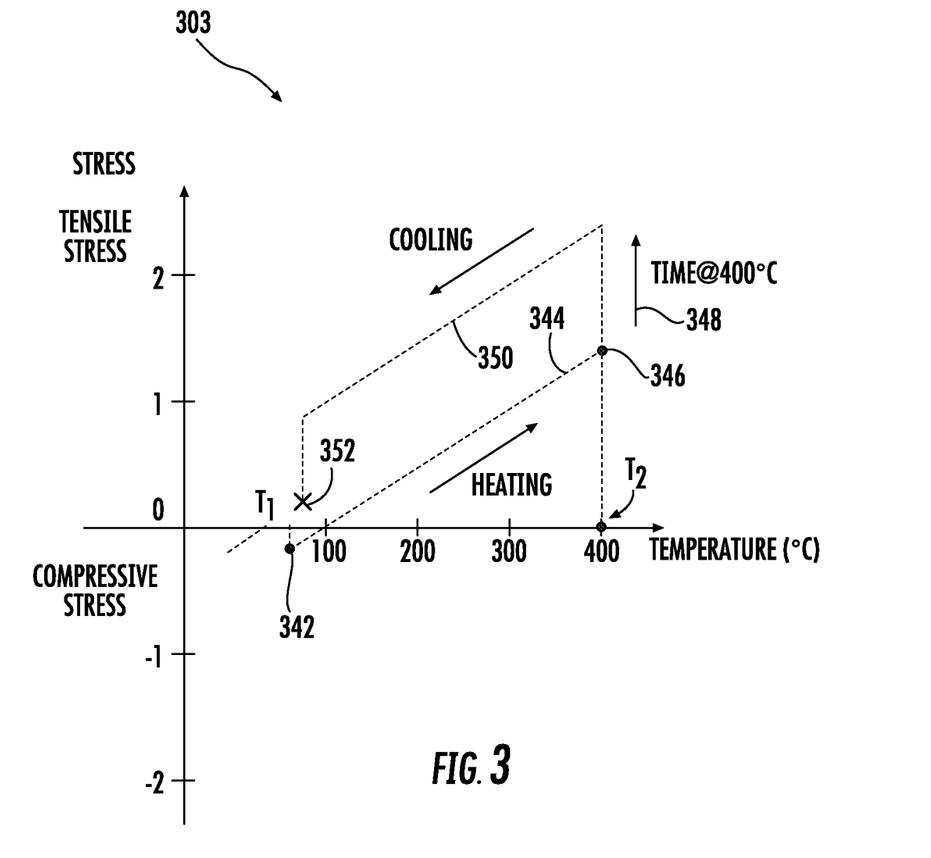
FIG. 3 depicts a stress diagram of a glass substrate in accordance with certain aspects of the present disclosure.

FIG. 3 depicts a stress hysteresis diagram 303 of a glass substrate (e.g., the glass substrate 220 in FIG. 2) in response to exposure to thermal processes, in accordance with certain aspects of the present disclosure. In the embodiment depicted in FIG. 3, the glass substrate exposed to the thermal process is a flat panel-sized substrate, for example, used as a cover sheet for LCD and LED displays incorporated in mobile telephones, display devices such as televisions and computer monitors, and various other electronic devices. In some embodiments, the glass substrate may be fabricated from a dielectric material selected from a group including silicon nitride ($Si_3N_4$), silicon nitride hydride ($Si_xN_y:H$), amorphous carbon, silicon carbide, silicon oxide, silicon oxynitride, a composite film of silicon oxide, silicon nitride, silicon carbide or amorphous carbon, an aluminum oxide layer, a tantalum oxide layer, a titanium oxide layer, spin-cast organic polymers, or other suitable material. In other embodiments, the glass substrate may be chemically strengthened by an ion-exchange process, wherein the strengthened glass substrate may be formed from various glass compositions including, yet not limited to, borosilicate glasses or aluminosilicate glasses.

In the stress hysteresis diagram 303 depicted in FIG. 3, the glass substrate may have a first stress value 342 (e.g., an original stress value). Most device materials undergo residual stress changes when thermally cycled during the subsequent processing operations at high temperatures. For example, during one processing stage, the glass substrate may undergo thermal energy treatment from a first temperature $T_1$ to a second temperature $T_2$ (e.g., an intended target processing temperature), as indicated by the trace line 344. While the thermal energy is absorbed by the glass substrate, the substrate stress undergoes stress relaxation governed by the glass substrate properties. Stress may also change due to thermal expansion mismatch relative to other sections of the glass substrate, as shown by the trace line 344, from the first stress value 342 (e.g., the original stress value) with a tensile glass property to a second stress value 346. Upon reaching the intended temperature $T_2$ during processing, the stress may be maintained at a steady value, e.g., the second stress value 346, as indicated by directional arrow 348, until the intended processing time or result is reached and completed. After the thermal energy treatment, the glass substrate is cooled, for example by resting the glass substrate on or near a cooling plate, or by placing the glass substrate in a room temperature environment. The glass substrate may be cooled to a room temperature or to the original starting temperature $T_1$, as indicated by the dotted line 350. As the glass substrate is cooled, the glass stress reduces to a second stress value 352, different than the original starting stress value 342.

In some embodiments, after a sequence of the thermal processing cycles during glass panel manufacturing processes, the stress of the glass substrate changes as compared to the stress of the original glass substrate. As the glass substrate may be densified, purified, or deformed after the thermal processing cycles, the residual stress may undesirably result in substrate bow, warpage or substrate curvature. In such cases, misalignment between the features present on the glass substrate pattern formed by subsequent processes may become significant, resulting in an overlay error and subsequent feature deformation or structure collapse. Additionally, most deposited materials have a native residual stress inducing substrate bow, warpage and grid-distortion simply as a function of the deposition of the materials. These stresses are often non-uniform across the substrate surface and lead to non-uniform substrate bow, warpage and grid-distortion.

According to certain aspects, non-uniformity in stress across the glass substrate may be introduced by various lithographic and etching processes, such as vapor deposition (CVD) or physical vapor deposition (PVD). Additionally, stress may be intrinsic to different substrates. For example, other substrates may have a different signature. As such, the non-uniformity (distortion) and errors to overlay and substrate distortion may be compounded in multiple levels.

In exemplary embodiments, by utilizing an implantation repair process, the stress hysteresis behavior at certain localized areas in the glass substrate may be exploited to correct warpage and repair grid-distortion. This will enable improved overlay during the subsequent flat panel processing operations. The implantation may assist repairing and releasing local strains or non-uniform stress distribution at certain discrete areas of the glass substrate so a more uniform substrate structure with a uniform or near-uniform quality may be obtained, thus improving lithographic alignment with minimum overlay error in a lithographic exposure process.

Figure 4:
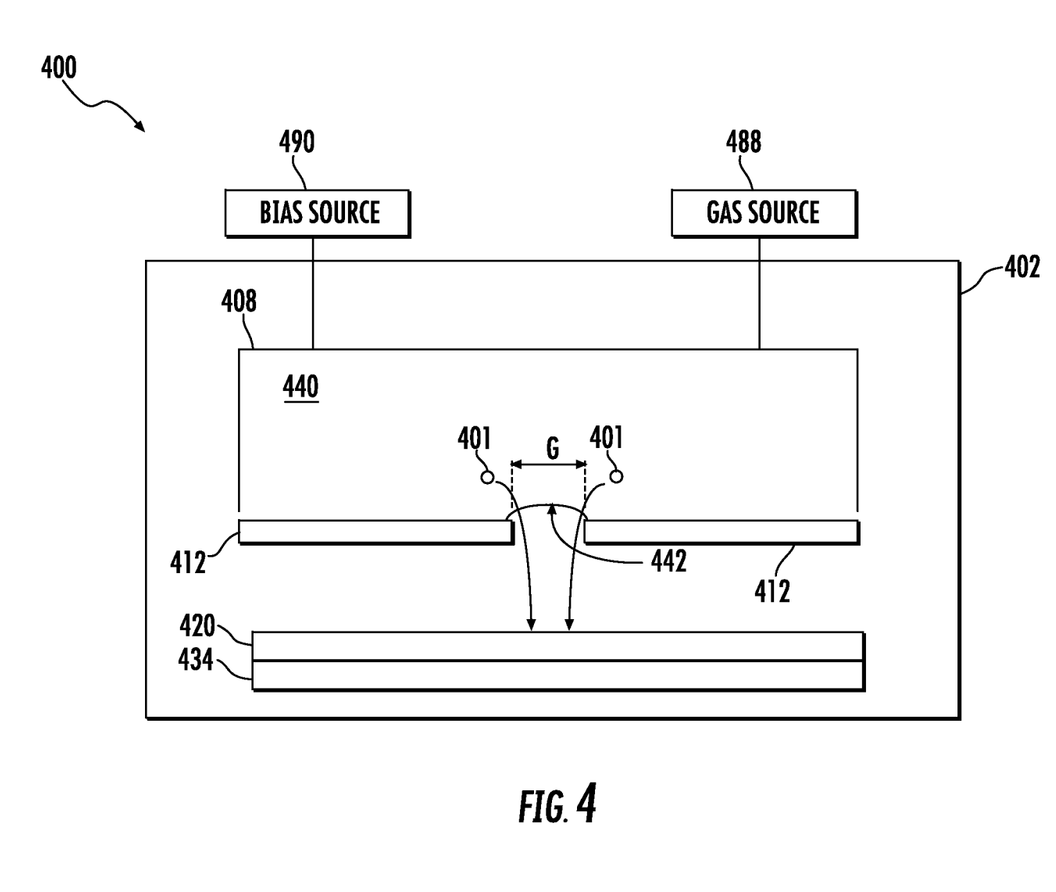
FIG. 4 depicts a treatment tool in accordance with certain aspects of the present disclosure.

FIG. 4 is a schematic diagram of a treatment tool 400 (e.g., a plasma processing apparatus) utilized to implant electrons or ions directly into a glass substrate 420 for altering a stress/strain of the glass substrate 420 so as to correct or repair overlay errors and/or substrate distortion present on semiconductor devices, in accordance with certain aspects of the present disclosure. In addition to the treatment tool 400 described below, more traditional ion implantation apparatuses, such as beamline ion implantation apparatus, may be used to perform the methods described herein.

Figure 5:
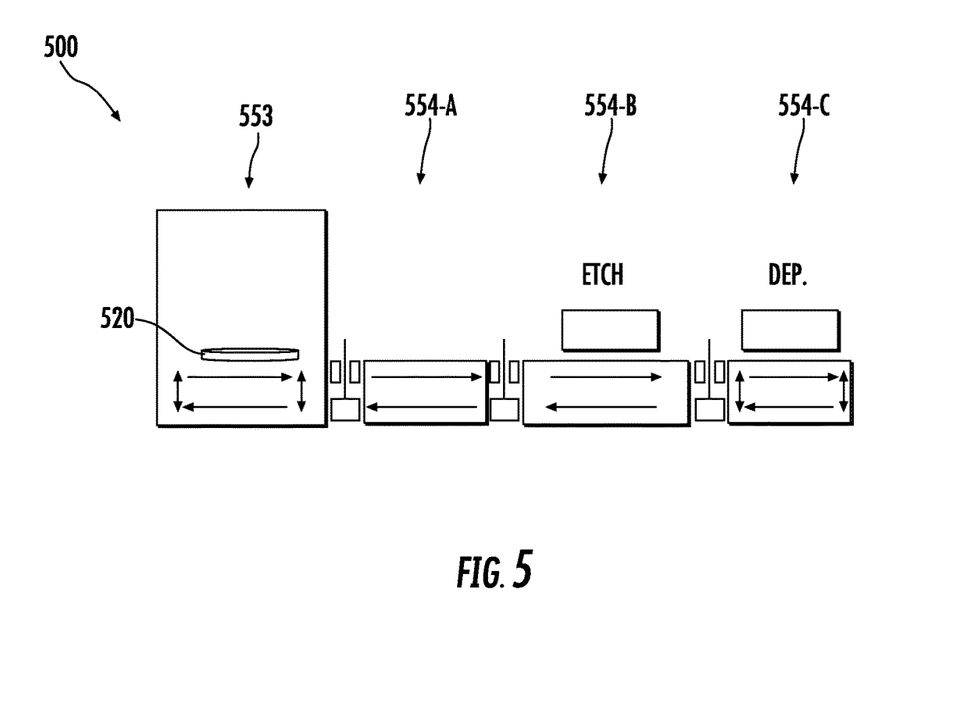
FIG. 5 depicts another treatment tool in accordance with certain aspects of the present disclosure.

For example, in one embodiment, the plasma process apparatus is an in-line substrate processing system, for example, as demonstrated in FIG. 5. The treatment tool 500 may be suitable for processing substrates in the manufacture of flat panel display (FPD) devices (e.g., LCD and other types). In this embodiment, the treatment tool 500 includes a source of energetic ions and a transport system (shown by arrows) to expose glass panels to the ions. Here, a large flat panel glass substrate 520 may initially be provided within an indexer 553. A plurality of processing stages 554A-C are arranged in-line (i.e., in series, and connected with respect to one another). A substrate conveying system (the details not shown in the figure) is arranged to convey the glass substrate 520 from the indexer 553 to the various processing stages 554A-C in turn. In various embodiments, the processing stages can also be referred to as a processing system, a processing apparatus, or equivalently a substrate processing tool.

In this non-limiting example, the processing stage 554-A may be a load lock chamber for bringing the glass substrate 520 from atmospheric pressure to vacuum. Processing stage 554-B may provide an etch process to the glass substrate 520, while processing stage 554-C may be a deposition stage for depositing material layers on the glass substrate 520. In various embodiments, the processing stage 554-C may utilize one or more deposition techniques, such as chemical vapor deposition (CVD), plasma-enhanced chemical vapor deposition (PECVD), electroplating, and other suitable processes.

As shown, the glass substrate 520 is cycled through the processing stages 554A-C, and subsequently returned to the indexer 553. By arranging the different stages 554A-C of the substrate processing equipment in-line with the indexer 553, the footprint of the overall system is reduced compared with a batch processing system, the amount of work in progress is reduced, and the substrate processing rate may also be increased with respect to batch processing systems. In certain embodiments, the substrate conveying system is arranged to provide continuous (i.e., uninterrupted) motion of the glass substrate 520 through the lithographic (i.e., patterning) tools.

In yet another embodiment, ribbon beams and electron beams may be used to perform the embodiments described herein. One example of a beamline ion implantation apparatus is the Varian VIISta® Trident, available from Applied Materials, Inc. Santa Clara, Calif. In this embodiment, the apparatus may process glass panels using a ribbon configured as long as the panel in one direction, and by mechanically scanning the panel through the ribbon beam in a direction perpendicular to the ribbon direction, for example, at a non-constant velocity. The distribution of ions along the ribbon may be non-uniform and adjustable in some embodiments.

Referring again to FIG. 4, the treatment tool 400 includes a process chamber 402, a substrate carrier 434, and an ion source 408. The carrier 434 may be positioned in the processing chamber 402 for supporting the glass substrate 420. The carrier 434 may be coupled to an actuator (not shown) for causing the carrier 434 to move in a scanning motion. The scanning motion may be a back and forth movement within a plane generally parallel to the ion source 408. The ion source 408 is configured to generate the plasma 440 in the process chamber 402. The ion source 408 includes a front plate 412 defining a gap having a horizontal extent (G). The front plate 412 may comprise an insulating material, a semi-conducting material, or a conductive material.

In operation, a gas source 488 may supply an ionizable gas to the process chamber 402. Examples of an ionizable gas may include $BF_3$, $BI_3$, $N_2$, Ar, $PH_3$, $AsH_3$, $B_2H_6$, $H_2$, Xe, Kr, Ne, He, $CH_4$, $CF_4$, $AsF_5$, $PF_3$ and $PF_5$, among others. More specifically, species of ions may include Ar+, He+, $H_3$+, $H_2$+, H+, Ne+, F+, C+, $CF_x$+, $CH_x$+, $C_xH_y$, N+, B+, $BF_2$+, $B_2H_x$+, Xe+ and molecular carbon, boron, or boron carbide ions. The ion source 408 may generate the plasma 440 by exciting and ionizing the gas provided to the process chamber 402. The ions 401 are attracted from the plasma 440 across a plasma sheath 442. For example, a bias source 490 is configured to bias the ion source 408 to propel the ions 401 from the plasma 440 across the plasma sheath 442. The bias source 490 may be a DC power supply to provide a DC voltage bias signal or an RF power supply to provide an RF bias signal.

According to certain aspects, the treatment tool 400 is just one example of an apparatus to be used. According to certain aspects, as stated above, traditional plasma processing apparatuses may be used, as well as pattern beams, electron beams (e.g., pulsed or continuous), raster scanning, variable scanning, and any other method of implanting ions or electrons may be used.

Furthermore, in some embodiments, one or more energetic particle beams may include a cylindrical shaped beam, a plurality of adjacent or overlapping cylindrical beams, or a ribbon shaped beam (e.g., a continuous rectangular shaped beam). According to certain aspects, the one or more energetic particle beams can be moved relative to the glass substrate 420 during processing and/or the glass substrate 420 can be moved relative to the energetic particle beam during processing. According to certain aspects, different processing characteristics may be used, such as beam energy, beam angle, beam angle relative to the transfer direction of the glass substrate 420, beam composition (e.g., gas ions), or other useful property to the surface of the glass substrate 420.

The treatment tool 400 of FIG. 4, or other system capable of implanting ions or electrons, may be used to modulate stress on the glass substrate 420. For example, certain localized areas may be implanted or doped to either increase or reduce localized stress (e.g., based on the type of ion implanted, the energy of the implantation, the location and/or angle of the implantation, etc.) in the localized area of the glass substrate 420. According to certain aspects, the processing may be performed according to a mapping of stress on the glass substrate 420 (e.g., the stress pattern 234 shown in FIG. 2). According to certain aspects, the implantation and/or doping process may be performed to achieve more uniformity in stress across the glass substrate 420 and/or to lower overall (average) stress across the substrate.

According to certain aspects, implanting ions of the same or similar chemical makeup as the substrate layer being subject to the doping may be desirable.

According to certain aspects, although localized stress modulation by implantation is discussed herein as a processing method for correcting overlay errors and EPE, the techniques may be applied to any glass substrate in order to modulate local stress.

Figure 6:
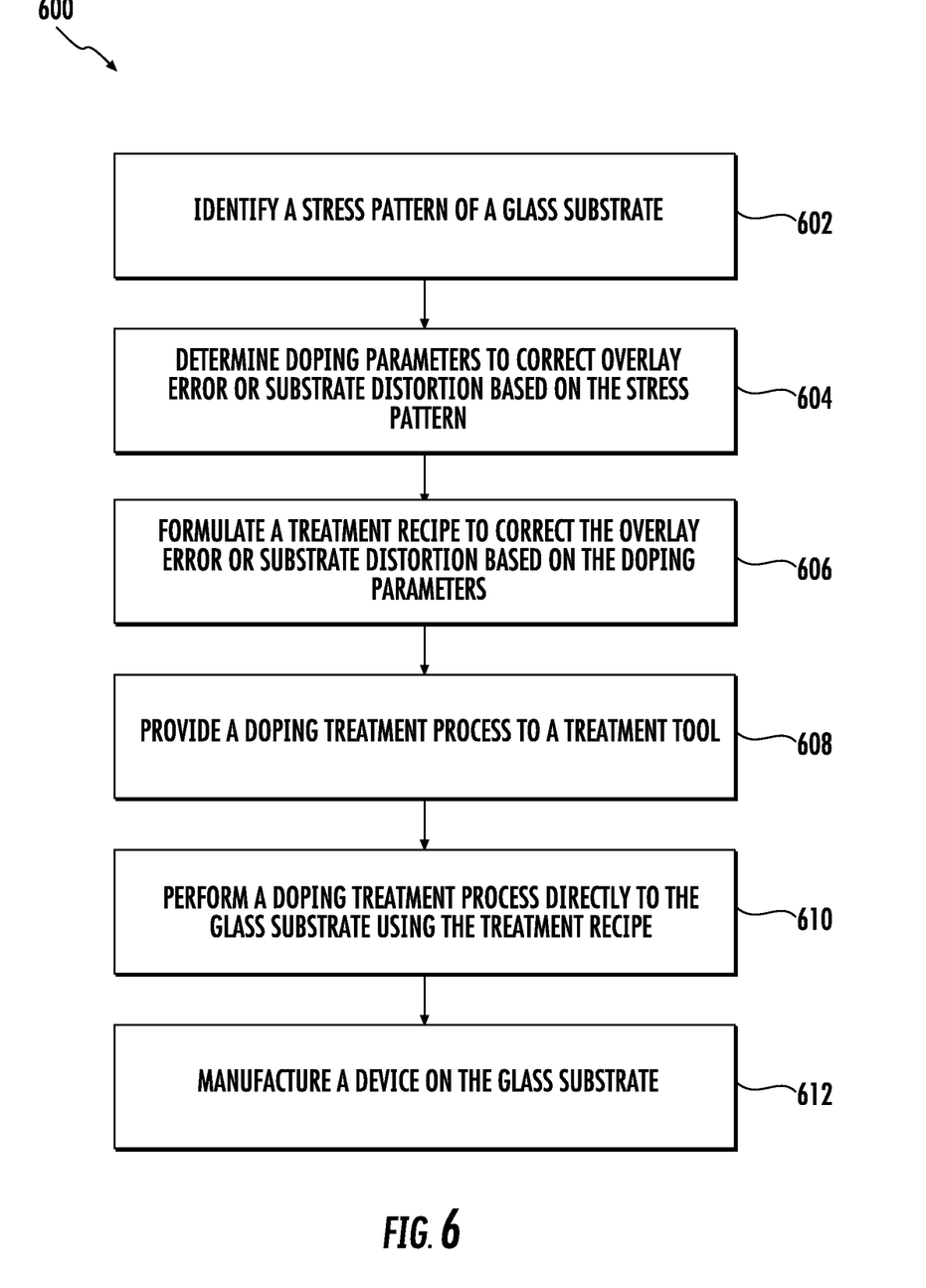
FIG. 6 is a flowchart illustrating an exemplary process according to the present disclosure.

FIG. 6 depicts a flow diagram of a process 600 for performing an overlay correction process by modifying a bulk property of a glass substrate by utilizing an implantation process, in accordance with certain aspects of the present disclosure. In some embodiments, the process 600 may be implemented using a computer system (e.g., the computer system 102 of FIG. 1). As such, the process 600 of FIG. 6 may illustrate the functionality and/or operation of possible implementations of systems, methods, and computer program products according to various embodiments of the present disclosure. In this regard, the blocks in the flowchart may represent a module, segment, or portion of code, comprising one or more executable instructions for implementing the specified logical function(s). As also noted, in some alternative implementations, the functions noted in the blocks might occur out of the order depicted in the figures. For example, two blocks shown in succession may, in fact, be executed concurrently. As also noted, the blocks of the process 600 can be implemented by special purpose hardware-based systems for performing the specified functions or acts, or combinations of special purpose hardware and computer instructions.

As shown, the process 600 may include identifying a stress pattern of a glass substrate, as shown at block 602. In some embodiments, the stress pattern is identified by performing a measurement process in a metrology tool on the glass substrate.

The process 600 may further include determining doping/implantation parameters to correct overlay error or substrate distortion based on the stress pattern, as shown at block 604. In some embodiments, the implantation/doping parameters comprise at least one of energy for performing the implantation/doping, whether electrons or ions are used, type of ion used for the doping (e.g., using doping ions of the same type as ions on the substrate layer to be doped), or doping concentration. In some embodiments, determining the doping parameters may include determining discrete locations of the substrate to be treated. In some embodiments, the doping parameters are determined by analyzing data within a database library, e.g., by correlating stress changes in the glass substrate to a plurality of doping parameters, and identifying/extracting a match.

The process 600 may further include determining/formulating a treatment recipe from the doping parameters, as shown at block 606. In some embodiments, the treatment recipe is determined by comparing the stress pattern to data within the database library and determining a suitable match.

The process 600 may further include providing the doping recipe to a treatment tool, as shown at block 608. In some embodiments, the treatment tool includes a transport system for positioning and moving the glass substrate, and an ion source for implanting the glass substrate.

The process 600 may further include performing a doping treatment process to the glass substrate according to the treatment recipe, as shown at block 610. In some embodiments, the doping treatment process is performed using at least one of: a plasma beam, an electron beam, a ribbon beam, or a particle beam. In some embodiments, the treatment tool performs a doping treatment process, such as ion bombardment, directly to an exposed surface of the glass substrate according to the treatment recipe to locally modify a bulk property of a glass substrate. In exemplary embodiments, performing the doping treatment process on the glass substrate corrects the defect(s) evidenced by the identified stress pattern. In some embodiments, the doping treatment process may include altering a substrate stress locally or globally in a layer of the glass substrate and/or correcting the determined overlay error or substrate distortion found on the substrate. In some embodiments, the doping repair recipe may be determined in response to a glass stress, substrate curvature, in-plane distortion, or pattern shift detected on the substrate. Substrate distortion measured on the substrate may be determined by measuring surface stress of a portion of the substrate.

The process 600 may further include manufacturing a device on the glass substrate after the doping treatment process, as shown at block 612, e.g., following the processing operations shown in blocks 602-610.

Figure 7:
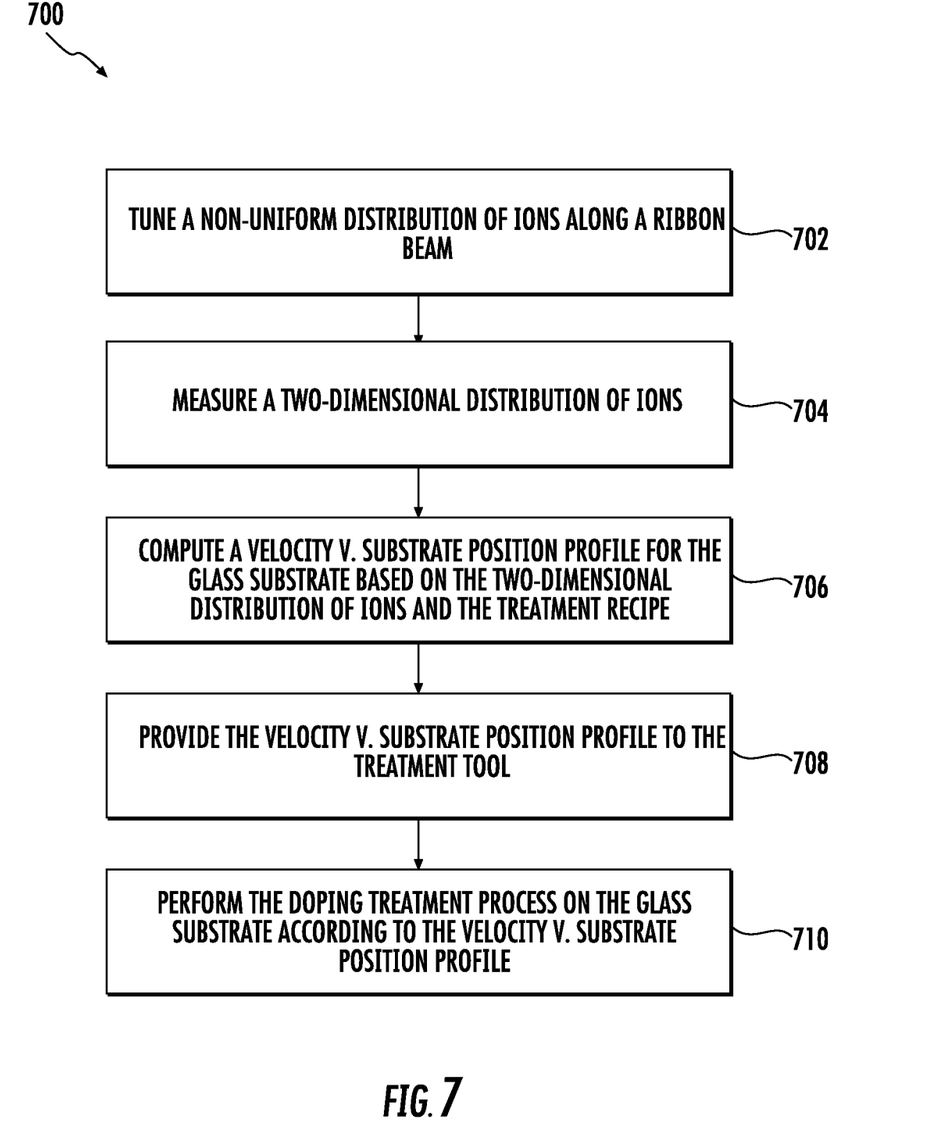
FIG. 7 is a flowchart illustrating an exemplary process according to the present disclosure.

FIG. 7 depicts a flow diagram of a process 700 for preparing the treatment tool using the treatment recipe, in accordance with certain aspects of the present disclosure.

The process 700 may include tuning a non-uniform distribution of ions along a ribbon beam, as shown at block 702. In some embodiments, the intended non-uniform distribution of ions may be established by making adjustments to magnetic fields in the treatment tool, by changing the scan speed of the ion beam as the ion beam moves across the substrate in a scanned beam implanter, or by design of the ion source to produce the intended non-uniform beam at the point of origin, for instance by shaping the front plate opening. In some embodiments, the non-uniformity may be verified by a measurement, for instance, with a Faraday cup detector of charged particles.

The process 700 may further include measuring a two-dimensional distribution of ions, as shown at block 704. In some embodiments, measurement of a two-dimensional distribution of ion current could be made by a multi-pixel Faraday cup. At the end of such a measurement in a ribbon beam, for instance, the beam current density at every position along and/or across the ribbon is known.

The process 700 may further include computing a velocity versus substrate position profile for the glass substrate based on the two-dimensional distribution of ions and the treatment recipe, as shown at block 706.

The process 700 further includes providing the velocity versus substrate position profile to the treatment tool, as shown at block 708.

The process 700 further includes performing the doping treatment process on the glass substrate according to the velocity versus substrate position profile, as shown at block 710. Performing the doping treatment might include monitoring or regulating the ion beam current to assure the ion beam current is consistent with the reference distribution measured in block 704. The treatment may further include monitoring the substrate position relative to the beam, either by a positional encoder coupled to the substrate motion control system or by time elapsed from when the substrate was at a known position, and adjusting the substrate velocity in accordance with the velocity versus substrate position profile (block 706) and in response to the position of the substrate. The computer system may communicate with the treatment tool to perform the treatment operation automatically.

In sum, embodiments of the disclosure provide a number of advantages. A first advantage includes utilizing a localized stress modulation by ion or electron implantation (doping) repair processes to correct overlay error and/or substrate distortion after a sequence of lithographic exposure processes. The localized stress modulation repair process is performed directly to the surface of the glass substrate to alter stress/strain distribution within the glass, thus eliminating or at least reducing the overlay error and/or substrate distortion so as to increase alignment precision for subsequent processing operations. A second advantage includes enabling treatment directly to the glass substrate, instead of to a film deposited over a substrate, where the creation of non-uniform ion distributions and non-uniform velocity profiles is significantly more complex.

While certain embodiments of the disclosure have been described herein, the disclosure is not limited thereto, as the disclosure is as broad in scope as the art will allow and the specification may be read likewise. Therefore, the above description is not to be construed as limiting. Instead, the above description is merely as exemplifications of particular embodiments. Those skilled in the art will envision other modifications within the scope and spirit of the claims appended hereto.

The invention claimed is:

1. A method for modifying a bulk property of a glass substrate, the method comprising:
   identifying a stress pattern of a glass substrate;
   determining doping parameters to correct a defect of the glass substrate based on the stress pattern;
   providing a treatment recipe to a treatment tool, the treatment recipe formulated according to the doping parameters, and the treatment recipe defining a doping treatment process to correct the defect; and
   performing the doping treatment process directly to an exposed surface of the glass substrate.

2. The method of claim 1, further comprising determining the treatment recipe by comparing the stress pattern with a database library stored in a computing system.

3. The method of claim 2, wherein the database library includes a correlation of a stress change in the glass substrate to the doping parameters.

4. The method of claim 1, further comprising performing a measurement process in a metrology tool on the glass substrate to identify the stress pattern.

5. The method of claim 1, wherein the doping treatment process is performed using at least one of a plasma beam, electron beam, ribbon beam, or particle beam.

6. The method of claim 5, further comprising preparing the treatment tool according to the treatment recipe by performing the following:
   measuring a two-dimensional distribution of ions;
   computing a velocity versus substrate position profile for the glass substrate based on the two-dimensional distribution of ions and the treatment recipe; and
   providing the velocity versus substrate position profile to the treatment tool, wherein the doping treatment process is performed on the glass substrate according to the velocity versus substrate position profile.

7. The method of claim 6, further comprising preparing the treatment tool by tuning a non-uniform distribution of ions along the ribbon beam.

8. The method of claim 1, further comprising correcting the defect corresponding to the stress pattern by performing the doping treatment process directly to an exposed top surface of the glass substrate.

9. The method of claim 1, further comprising manufacturing a device on the glass substrate after the doping treatment process.

10. A method for determining and correcting errors on a glass substrate, the method comprising:
    identifying a stress pattern of a glass substrate using a metrology tool;
    determining doping parameters to correct an overlay error or substrate distortion based on the stress pattern;
    providing a treatment recipe to a treatment tool based on the doping parameters determined to correct the substrate distortion or overlay error; and
    modifying a bulk property of the glass substrate by performing a doping treatment process directly to an exposed surface of the glass substrate using the treatment recipe.

11. The method of claim 10, further comprising determining the treatment recipe by comparing the stress pattern with a database library stored in a computing system, wherein the database library includes data correlating stress changes in glass substrates to the doping parameters.

12. The method of claim 10, wherein the doping treatment process is performed using at least one of a plasma beam, electron beam, ribbon beam, or particle beam.

13. The method of claim 10, further comprising preparing the treatment tool according to the treatment recipe by performing the following:
    measuring a two-dimensional distribution of ions;
    computing a velocity versus substrate position profile for the glass substrate based on the two-dimensional distribution of ions and the treatment recipe; and
    providing the velocity versus substrate position profile to the treatment tool, wherein the doping treatment process is performed on the glass substrate according to the velocity versus substrate position profile.

14. The method of claim 10, further comprising manufacturing a device on the glass substrate after the doping treatment process.

* * * * *